United States Patent
Middleton

[11] Patent Number: 5,948,250
[45] Date of Patent: Sep. 7, 1999

[54] FILTER BERM

[75] Inventor: Dennis G. Middleton, Anderson, S.C.

[73] Assignee: Basic Concepts, Inc., Anderson, S.C.

[21] Appl. No.: 09/055,756

[22] Filed: Apr. 6, 1998

[51] Int. Cl.⁶ .................................................. C02F 1/40
[52] U.S. Cl. .................... 210/232; 210/484; 210/488; 210/924; 405/52; 405/60
[58] Field of Search ..................... 210/153, 232, 210/163–166, 242.4, 680, 924, 484, 488, 500.1; 405/52, 60

[56] References Cited

U.S. PATENT DOCUMENTS

| 935,278 | 9/1909 | Smyth . | |
|---|---|---|---|
| 4,031,676 | 6/1977 | Dally | 52/102 |
| 4,151,618 | 5/1979 | Carpenter | 5/284 |
| 4,671,024 | 6/1987 | Schumacher | 52/2 |
| 4,792,399 | 12/1988 | Haney et al. . | |
| 4,981,391 | 1/1991 | Klementovich | 405/52 |
| 5,088,139 | 2/1992 | Bloom | 5/420 |
| 5,099,872 | 3/1992 | Tarvin et al. | 137/312 |
| 5,206,964 | 5/1993 | Wilson, Sr. | 5/417 |
| 5,284,048 | 2/1994 | Horner . | |
| 5,351,348 | 10/1994 | Beger | 5/420 |
| 5,387,053 | 2/1995 | Williamson | 405/52 |
| 5,405,217 | 4/1995 | Dias et al. | 405/25 |
| 5,511,683 | 4/1996 | Dailey | 220/573 |
| 5,573,348 | 11/1996 | Morgan . | |
| 5,573,349 | 11/1996 | Paoluccio . | |
| 5,743,674 | 4/1998 | Healy . | |
| 5,800,091 | 9/1998 | Van Romer . | |

*Primary Examiner*—Jay H. Woo
*Assistant Examiner*—Fred Prince
*Attorney, Agent, or Firm*—Henry S. Jaudon; Cort Flint

[57] ABSTRACT

A portable berm for use in and out of doors. The berm includes a impervious flexible synthetic floor which has a berm wall formed about its periphery. The berm wall comprises a plurality of elongated plastic strips which are attached to the floor along their inner and outer edges each forming a cavity which extend around the floor. A plurality of openings are formed in the strips adjacent at least their edges. An adsorbent and absorbent hydrophobic material which allows water to pass through but absorbs chemical contaminants is positioned within the cavities to extend about the floor.

22 Claims, 4 Drawing Sheets

FILTER BERM

BACKGROUND OF THE INVENTION

This invention relates to a filter berm for inside and outside use with hydrocarbons. The berm functions to stabilize and hold by adsorption or absorption hydrocarbons while allowing water to pass out.

Environmental regulations require a cessation of chemical spillage. In order to conform with these regulations it has become necessary that containment devices be utilized in areas where spillage is likely to occur.

A variety of containment devices, drip pans, absorbent mats are known and in use. Most of these devices are merely containment units designed to pool the waste or they may include removal units to draw the waste away. These containment pools are not satisfactory as they prevent movement within the enclosed and protected area because of pooling and they require excessive maintenance. The containment units with removal devices are much more expensive and bulky. This presents problems for some uses. U.S. Pat. No. 4,671,024; No. 4,981,391; and No. 5,511,683 show examples of the pool type container while U.S. Pat. No. 5,099,872 shows an example of a pool container with a waste removal unit.

The instant invention has for an object a low cost, light weight berm for use in or out of doors.

Another object of the invention is an inexpensive berm to hold and stabilize an adsorption and absorption material which traps hydrocarbons.

Another object of the invention is a berm having a replaceable absorbent and adsorbent material.

Another object of the invention is a berm for chemical storage which will not collect water.

Another object of the invention is a berm for use out of doors with vessels containing hydrocarbons which is operative to collect spilled hydrocarbons while allowing water to pass out.

Another object is to provide a berm which shields the adsorption and absorption material from extraneous contaminants providing increased efficiency.

SUMMARY OF THE INVENTION

The provision of a portable berm which is operative to capture hydrocarbons while allowing water to escape therefrom. The berm comprises a flooring formed of a flexible synthetic sheet having a plurality of sides. A berm wall is formed along each side of the flooring. The berm walls are formed of an elongated flexible synthetic strip having first and second ends and inner and outer edges. Each of the edges of the synthetic strips are attached to the flooring with their inner corners being arranged in juxtaposed positions. There are a plurality of drainage holes arranged along at least the inner edges and preferably the inner and outer edges which are positioned to allow fluid accumulating on the flooring to pass there through.

The synthetic strips may be formed of a non-porous flexible synthetic sheet of the same material as the flooring. The drainage holes comprise weep holes which are cut or formed along the inner and outer edges of strips formed of this material.

Another arrangement utilizes an open mesh-type fabric of a suitable synthetic material for forming the strips. The open mesh fabric is preferably coated for stability.

Yet another arrangement utilizes a combination of a non-porous flexible synthetic material united or secured with a synthetic open mesh fabric to form the strips. The open mesh material forms the inner and outer edges while the flexible synthetic sheet material forms the central portion of the strip.

An absorbent member or members of hydrophobic absorbent material is disposed within the cavities and arranged to extend around the periphery of the flooring. These functions to absorb hydrocarbons spilled on the flooring which pass through the inner weep holes while any water spilled on the flooring will pass through the inner and outer weep holes and away from the berm.

The inner edges of the strips forming the berm walls are permanently attached to the flooring while the outer edges are releasably connected with the flooring. Preferably snaps connect the outer edges although other known attaching means could be used.

A portable berm for use in or out of doors comprising a berm wall formed of an elongated strip having inner and outer edges arranged along and attached to the flooring. A channel is formed between each strip and the flooring. The strips are preferably formed of vinyl material and their inner edges are attached with the flooring, also preferably formed of a vinyl material, by a weld. Their outer edges are releasably attached with the flooring.

The absorbent material is arranged within the channels to extend about the flooring. The absorbent material contains a hydrophobic material which is capable of absorbing hydrocarbons.

Elongated slits or open mesh fabric is arranged along the inner edges of the berm wall. These slits or open mesh fabric are located to merge with the flooring along the weld. This allows fluid hydrocarbons deposited within the berm to pass into the channel to be absorbed by the absorbent material while water passes through the sock and away from the berm. The weep holes may be formed as vertical slits with the inner slits being aligned with outer slits.

There is more drainage capacity along the outer edges of the strips because they are longer than the inner edges. This is because the strip ends are cut at an angle to allow the outer corners of adjacent ends to be positioned approximate each other.

The inner edges of the strips forming the berm wall are welded with the flooring using known means such as heat or radio frequency.

DESCRIPTION OF A PREFERRED EMBODIMENT

Figure 1:
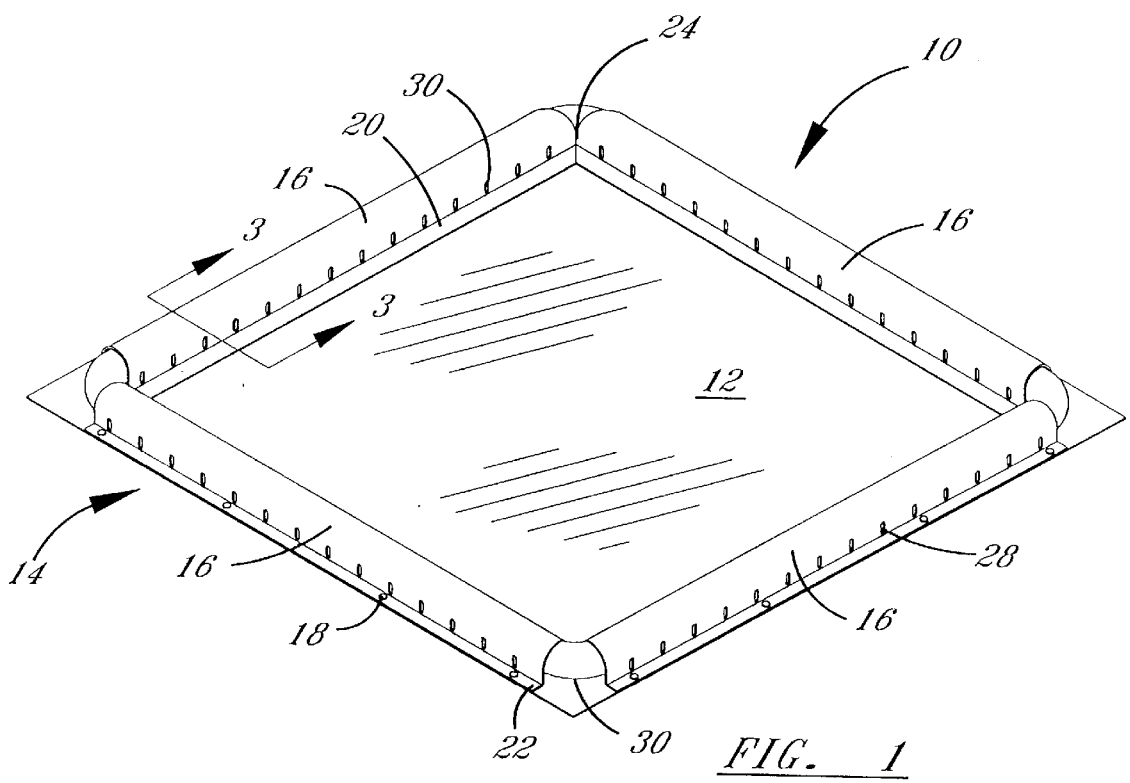
FIG. 1 is a perspective view of the novel berm arrangement.
Figure 2:
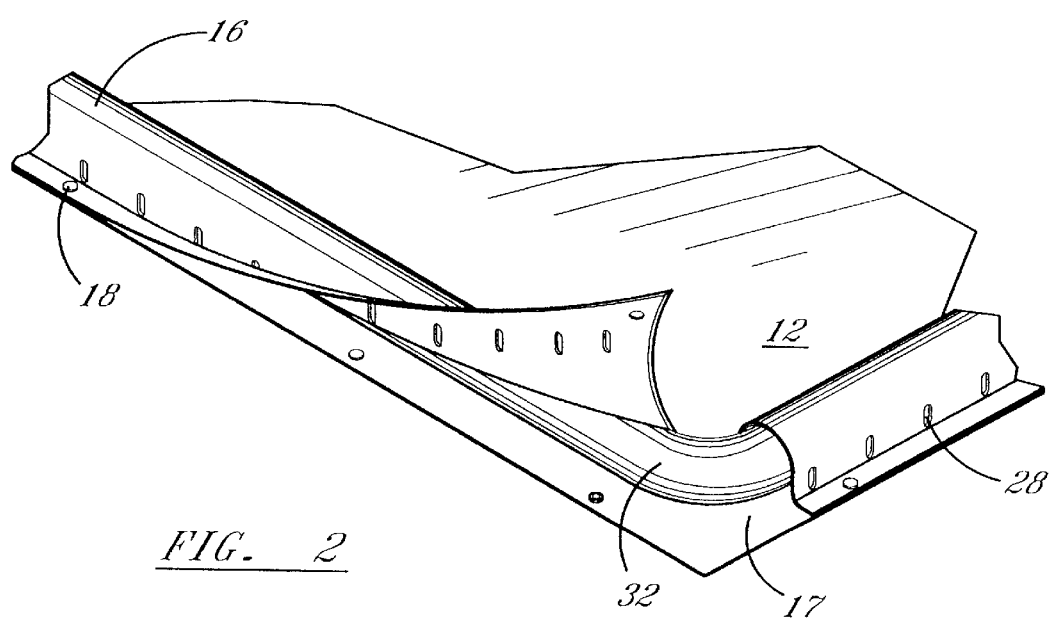
FIG. 2 is a perspective view similar to FIG. 1 showing a strip formed of non-porous synthetic sheet material partially disconnected.

Turning now to the drawings, FIGS. 1 and 2 are perspective views of a first embodiment of the novel berm.

Berm 10, which may be formed from a variety of flexible synthetic materials including plastics and polymer blends, is constructed to be generally square. Of course this configuration may vary depending upon the intended use, to be rectangular or triangular. The berm is normally sized from about 50" by 50" outer diameter to about 12' by 12' outer diameter. These sizes may vary to be greater or smaller, again depending upon the desired use.

Berm 10 includes a floor 12 formed of a flexible synthetic sheet which is between ⅛" and ¼" thick. A berm wall 14 is formed about the periphery of the floor and comprises four flexible synthetic plastic strips 16 of substantially the same or slightly more flexibility than flooring 10. Polyvinylchloride is a preferred material for both floor 12 and strips 16 although any flexible synthetic material having the necessary impervious characteristics such as polyethylene, polypropylene, polyurethane, rubber, and either supported or unsupported film may be used.

Each strip is about 10" wide and about 6" shorter than the floor edge to which it is attached. Snaps 18, or other suitable attachment means such as hook and loop attachment means (VELCRO), are arranged along the outer edge of strips 16.

The inner edge of the strips is welded with flooring 12 as indicated at 20. The weld is preferably formed by heat or radio frequency although a permanent cement bond or other permanent bonds could be acceptable. Weld 20 and snaps 18 are laterally spaced a distance which allows strips 16 to form a cavity 17 between its inner surface and the upper surface of the flooring. The cavity is formed with a vertical spacing of at least 2.75".

Opposed ends 22 of strips 16 are cut at an angle of slightly less than 45°. This allows inner corners of adjacent ends 22 to be positioned to be in substantial contact with each other as indicated at 24. Adjacent outer corners are preferably slightly spaced leaving an open area at each corner. These open areas allow easy access to and inspection of the adsorption and absorption material (to be described later) positioned in cavity 17. These corners, with a 45° cut, would be positioned to contact each other forming a substantially closed continuous cavity about flooring 12. This arrangement would provide maximum protection from outside contaminants which can soil the absorbent material prematurely.

Vertical slots or weep holes 28 and 30, which are about ⅜" wide and 1½" in length, are formed along the inner and outer edges of strips 16, i.e., about ¾" inwardly of the edges. Centers of these slots or weep holes are spaced by about 2" and the inner and outer edge slots are preferably, but not necessarily aligned. There are usually two more outer slots 28 than inner slots 30 due to the cut of the end portions.

Weld 20 is positioned relative to strips 16 to extend slightly beyond the lower edge of slots 30. This forms slots 30 integral with flooring 10 or causes slots 30 to merge with flooring 10 which eliminates substantially all vertical obstruction and allows complete drainage from the flooring.

Figure 3:
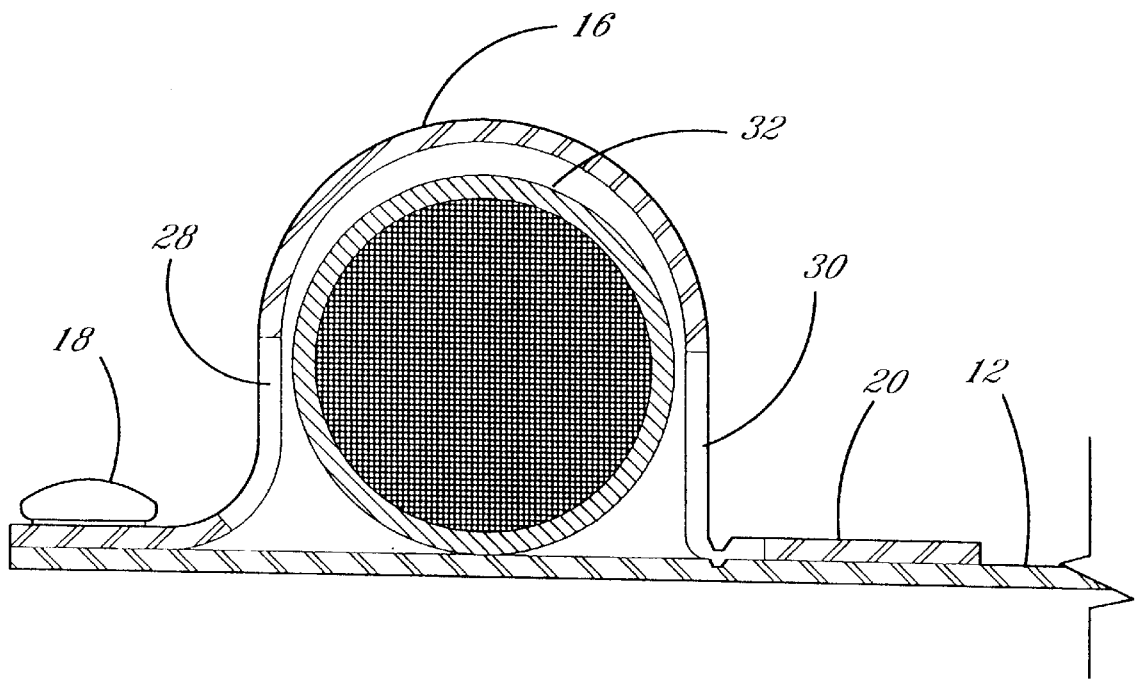
FIG. 3 is a cutaway end view of the berm wall.
Figure 4:
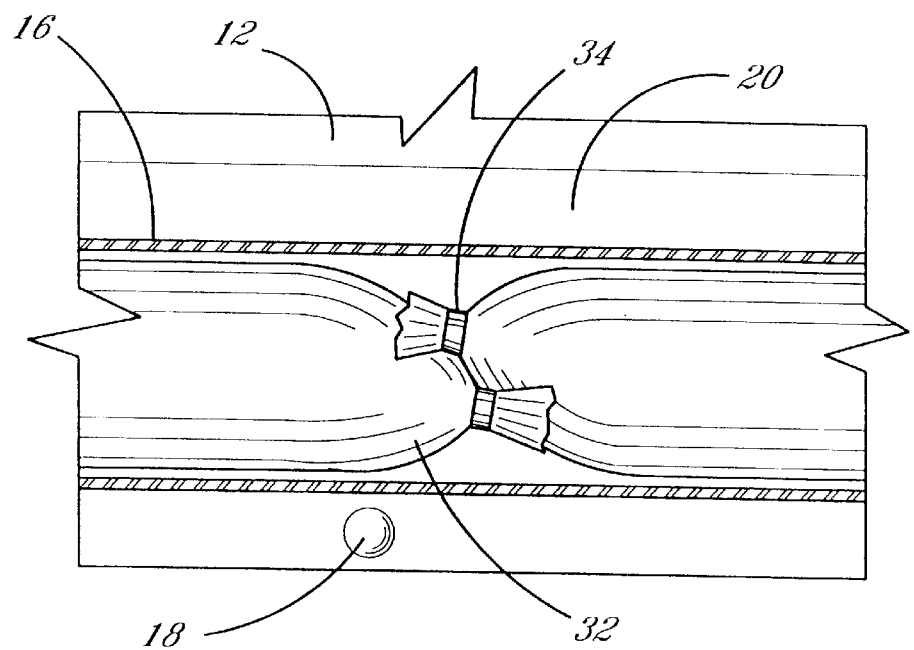
FIG. 4 is a cutaway side view showing the sock end engagement.

An elongated sock or sausage 32 is located in cavities 17, FIG. 3, and is arranged to extend completely around flooring 12. Preferably sock 32 has a diameter of about 2.75" although this can vary as desired. The diameter of the sock, which forms the vertical height of the berm wall, has a length dependent upon the circumference of flooring 12. It is desired that the opposed ends 34 of the sock be engaged or overlap as shown in FIG. 4 to form a complete enclosure. Alternatively two or more socks arranged to overlap end to end or properly shaped pads or mats arranged to be continuous may be used satisfactorily.

Socks 32 are normally filled with a hydrophobic absorbent material indicated at 31 which will not absorb water but is highly absorbent of hydrocarbons. Such type socks are commercially available and well known in the industry. The PIG absorbent sock, which is manufactured by New PIG Corporation of Tipton, Pa., is an acceptable product.

Clearly other type of packaging may be utilized for absorbing material 31. Socks 32 may be substituted for with matting formed of the absorbing material formed as elongate blocks and arranged end to end to overlap. Another alternative arrangement is to roll sheets of absorbent material into elongate sleeves which may then be arranged end to end to overlap within cavity 17. The inventive concept includes any suitable packaging of the absorbent or adsorbent material which may be arranged within cavity 17.

While not the primary purpose of the invention, sock 32 or other selected packaged absorbent could also be filled with a material which will also absorb water.

In operation, berm 10 is positioned outside on the ground or inside on the floor of a building. Normally, storage containers containing oil or other hydrocarbons, are positioned on flooring 12 inside the berm wall. Should leakage or spillage occur, the hydrocarbons will flow across the floor and out inner weep holes 30 to be absorbed by sock 32. Should water be mixed with the hydrocarbons, it will pass beneath or through the sock and out outer weep holes 28 and/or possibly beneath the outer edge of strips 16. This action prevents the berm from prematurely filling with water which would require frequent maintenance of the berm. When berm 10 is located out of doors, this arrangement prevents the berm from filling with rain water, again providing for a more efficient berm which requires less maintenance.

When sock 32 becomes saturated, snaps 18 are disconnected and strips 16 are raised to provide access to socks 32. The socks are replaced with fresh ones and strips 16 are reconnected with flooring 12. This may be done without disturbing the material stored on flooring 12.

The open areas between outer ends of strips 16 allow visual inspection of those portions of sock 32 passing between the strips. Although not necessary, visual inspection is an easy and spontaneous assist in determining when the sock has become saturated with hydrocarbons and is in need of replacement.

Figure 5:
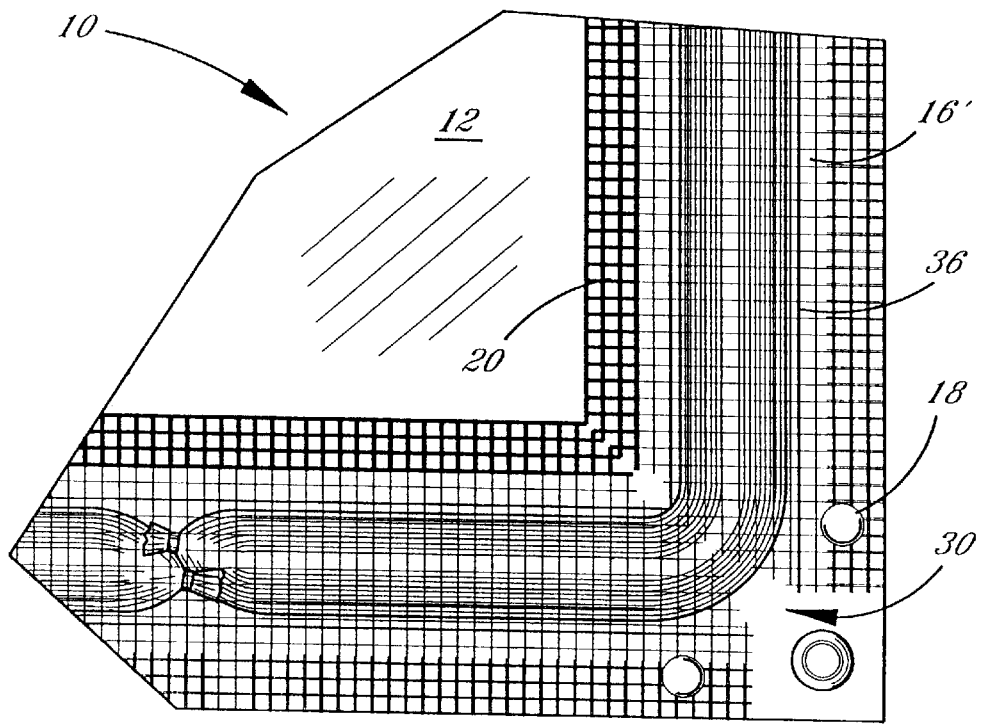
FIG. 5 is a top sectional view showing the strips formed of open net like fabric of synthetic material.
Figure 7:
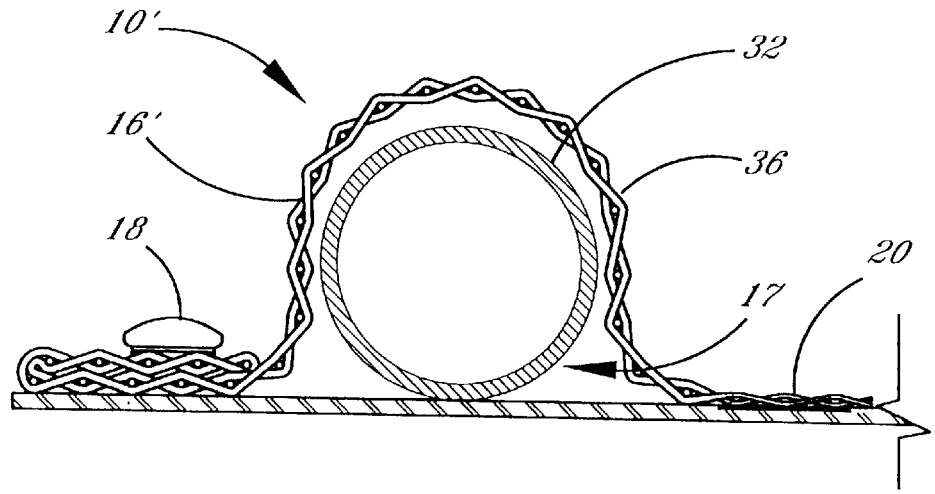
FIG. 7 is a sectional end view showing the arrangement of FIG. 5.
Figure 9:
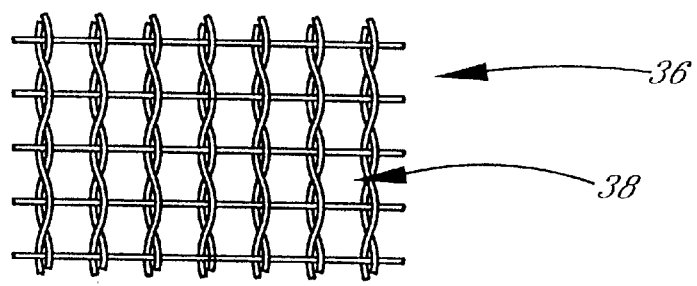
FIG. 9 is a sectional top view of the fabric employed in FIGS. 5 and 6.

Turning now to FIGS. 5 and 7 an alternative structure for the berm is shown at 10'. In this embodiment strips 16' are formed of an open mesh fabric 36, best shown in FIG. 9, formed of synthetic mono- or multi-filament yarns interengaged to form a uniform open structure.

Preferably, fabric 36 is formed in a leno weave and openings 38 are formed to be about ¼" square. A coating is applied to secure the yarns in their relative positions which provides stability when in use. The synthetic material forming fabric 36 is preferably polyvinylchloride although any of the materials earlier listed are suitable.

Strips 16' are shaped and united with flooring 12 in the manner earlier described with their inner edges secured with the flooring along openings 38 with weld 20. The opposed inner corners are in abutting relationship while the outer corners are separated forming an opening 30.

The outer edges of strips 16' are provided with releasable connecting members, such as snaps 18, so that the cavity formed may be exposed at the corners as desired.

Fabric 36 may be folded over or doubled along the opposed edges for added strength before being united with the floor and before the connecting members are affixed thereto.

Figure 6:
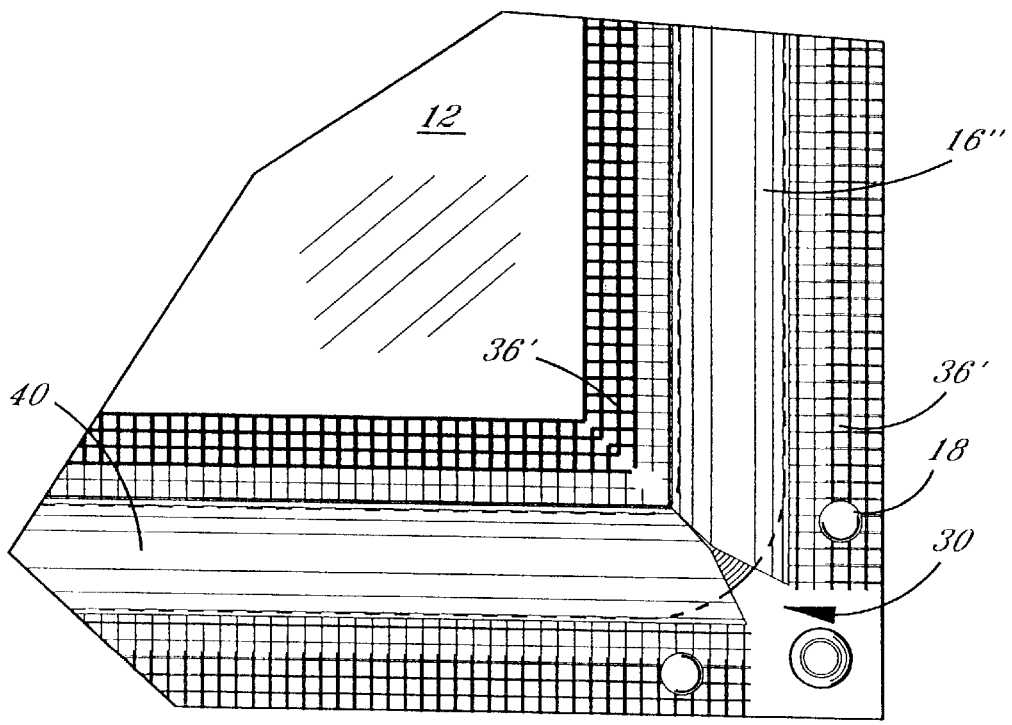
FIG. 6 is a top sectional view showing the strips formed of a combination of the sheet and net material.
Figure 8:
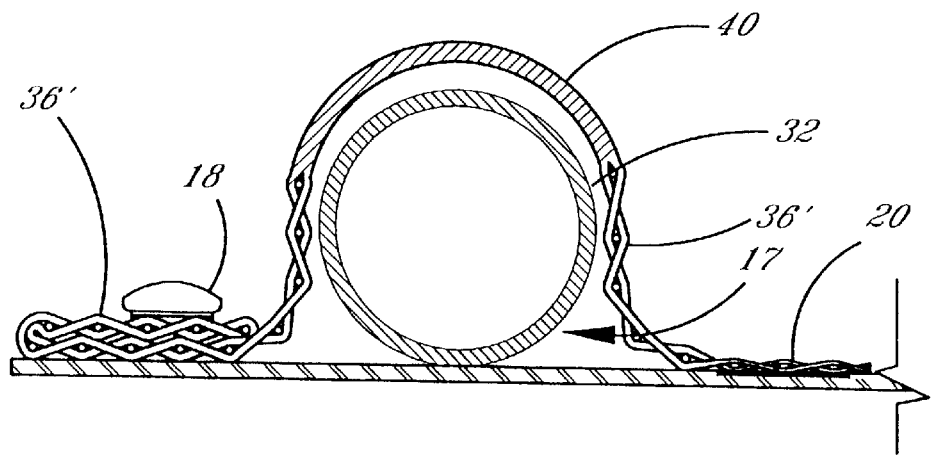
FIG. 8 is a sectional end view showing the arrangement of FIG. 6.

Turning now to FIGS. 6 and 8 yet another alternative structure for strip 16" is shown. In this embodiment, both the inner and outer edge portions of the strip are formed of an open mesh fabric 36' of the same construction as fabric 36 described above. The central portion of strip 16" is formed of a flexible non-porous synthetic sheet 40 of the same material as strip 16 and fabric 36'. The adjacent edges of fabric 36' and sheet 40 are bonded together by suitable means such as earlier described. The inner edge of the inner mesh fabric 36' is bonded with flooring 12 as described above. Also, the outer edge of outer fabric 36' is provided with attaching members, such as snaps 20, for removable attachment along the edges of flooring 12.

The open mesh fabric 36 and 36' in the arrangements shown in FIGS. 5, 6, 7, and 8 provides openings which allow fluid to pass from floor 12 into and through cavity 17. In the arrangement shown in FIGS. 6 and 8 central non-porous sheet 40 provides a protective cover for socks 32 which helps to prevent their being contaminated with extraneous contaminants such as airborne trash and dirt.

An alternative form of the arrangement shown in FIGS. 6 and 8 is for fabric 36' to be continuous as in FIGS. 5 and 7 with sheet 40 being bonded thereto in the position shown in FIGS. 6 and 8.

While a preferred embodiment of the invention has been described using specific terms, such description is for illustrative purposes only, and it is to be understood that changes and variations may be made without departing from the spirit or scope of the following claims.

What is claimed is:

1. A portable berm operative to capture hydrocarbons while allowing water to escape including:
   a flexible impervious synthetic flooring having a plurality of sides;
   a berm wall disposed along each side of said flooring, said berm wall comprising an elongated strip secured along each side of said flooring forming channels, said strips each having first and second ends and inner and outer edges with inner corners of said first and second ends being arranged in juxtaposed positions;
   a plurality of holes arranged at least adjacent said inner and outer edges, said holes being positioned to allow fluid accumulated on said flooring to pass there through;
   hydrophobic absorbent material disposed within said cavities and arranged to extend in continuous contact around said flooring; whereby,
   hydrocarbons spilled on said flooring will pass through said inner holes into said cavities to be absorbed by said hydrophobic absorbent material while water spilled on said flooring will pass through said inner holes into said cavities and out said outer holes and away from said cavities and said berm.

2. The berm of claim 1 wherein said inner edges are permanently attached to said flooring.

3. The berm of claim 1 wherein said strips are formed of impervious flexible synthetic sheet material and said holes are formed within said impervious synthetic sheet material.

4. The berm of claim 1 wherein said strips are formed of open mesh fabric material and said holes comprise the open areas of said fabric.

5. The berm of claim 1 wherein said inner and outer edges of said strips comprise an open mesh fabric material, said inner and outer edges being inner connected with opposed edges of a non-porous flexible synthetic sheet forming said strip.

6. The berm of claim 1 wherein said outer edges are releasably connected with said flooring.

7. The berm of claim 6 wherein snaps connect said outer edges with said flooring.

8. The berm of claim 1 wherein said berm wall includes open corners, said hydrophobic absorbent material passing around said corners to be exposed thereat.

9. The berm of claim 8 wherein said hydrophobic material is encased within an elongated sock.

10. The berm of claim 1 wherein said ends of said strips are formed at an angle, said angle allowing outer corners of adjacent of said ends to be located approximate each other.

11. The berm of claim 1 wherein said holes are vertical slits.

12. The berm of claim 11 wherein each of said inner vertical slits is aligned with an outer of said vertical slits.

13. The berm of claim 1 wherein the number of said outer holes is greater than the number of said inner holes.

14. The berm of claim 1 wherein each said inner edge of said strips forming said berm wall is welded with said flooring, said weld having a width which extends beyond the lower edge of said inner holes causing said inner holes to merge with said flooring.

15. The berm of claim 1 wherein said hydrophobic adsorbent material comprises a plurality of elongated socks arranged end to end and overlapping within said channels and about said berm.

16. A portable berm for use in and out of doors comprising:
    a continuous flexible, non-porous synthetic flooring member having four sides;
    a berm wall formed of a plurality of elongated strips of open mesh fabric with a synthetic coating positioned along each said floor side, said strips having inner and outer edges arranged in laterally spaced positions and attached to said flooring forming channels, said inner edges of said strips being permanently attached with said flooring;
    at least one sock filled with adsorbent and absorbent material positioned within said channels wherein said adsorbent and absorbent material encases said flooring;
    openings of said open mesh fabric being arranged in and along at least said inner edges of said strips, said openings being located to merge with said flooring along said attachment; whereby,
    fluid deposited within said berm may pass through said openings and into said channels and engagement with said absorbent sock.

17. The berm of claim 16 wherein said outer edges of said strips are releasably attached with said flooring allowing access for replacement of said sock.

18. The berm of claim 16 including providing openings along said outer edges of said strips.

19. The berm of claim 16 wherein said sock contains hydrophobic material; whereby,
    water may pass through said berm wall and out of said berm while hydrocarbons are absorbed in said sock.

20. The berm of claim 16 wherein said flooring is at least 48" by 48".

21. The berm of claim 16 wherein said sock has diameter slightly less then the diameter of said channels.

22. The berm of claim 16 wherein said berm wall is approximately 2.75" in height.

* * * * *